United States Patent [19]

Jovanovic et al.

[11] 4,288,500

[45] Sep. 8, 1981

[54] ELECTROCHEMICALLY ACTIVE ALUMINUM ALLOY AND COMPOSITE

[75] Inventors: Budimir B. Jovanović; Aleksandar R. Despic, both of Belgrade; Dragutin M. Drazić, New Belgrade, all of Yugoslavia

[73] Assignee: Institute of Technical Sciences of the Serbian Academy of Sciences and Art, Belgrade, Yugoslavia

[21] Appl. No.: 113,184

[22] Filed: Jan. 18, 1980

[30] Foreign Application Priority Data

Aug. 28, 1979 [YU] Yugoslavia ............................. 2098/79

[51] Int. Cl.³ ............................................. B32B 15/20
[52] U.S. Cl. ...................................... 428/650; 75/138; 204/148; 204/197; 204/293; 429/218
[58] Field of Search ........................... 75/138; 428/650; 204/148, 197, 293; 429/218

[56] References Cited

U.S. PATENT DOCUMENTS 4,098,606  7/1978  Despic et al. ........................ 75/138

Primary Examiner—R. Dean
Attorney, Agent, or Firm—Christel, Bean & Linihan

[57] ABSTRACT

An electrochemically active aluminum alloy characterized in that it consists essentially of, per 100 parts of weight of aluminum, 0.01-1 parts of weight of gallium and/or indium and in that it consists essentially of 0.01-1 parts of weight of phosphorous. The alloy is prepared by simultaneous fusion of the components in an inert atmosphere, or by a previous fusion of aluminum, gallium and/or indium to which phosphorous is then added in an inert atmosphere. Examples of use of the alloy include battery anodes and anti-corrosion coatings.

5 Claims, 4 Drawing Figures

1. AL(HP)-In(0.2%)
2. AL(HP)-In(0.1%-0.2%)-P(0.1%-1%)
3. AL(HP)-In(0.1%-0.2%)-P(0.1%-1%)

ELECTROCHEMICALLY ACTIVE ALUMINUM ALLOY AND COMPOSITE

The need for new electrochemical sources of current, and the problem of discovering an anode for anti-corrosion protection of metal, lead to the always present aim of substituting aluminium, as an electrochemically more suitable and cheaper material, for zinc and some other metals.

In principle, aluminium immersed in an electrolytic solution represents a useful system for such an application, because of its very negative theoretical potential and important ampere-hour capacity, as it exchanges 3 electrons per ionised atom. However, it is impossible to use pure aluminium because a protective oxide coating is formed on its surface, which spontaneously establishes a comparatively positive potential. In anodic polarisation its corrosion is increased and takes the form of a separation of gaseous hydrogen, i.e. a so-called negative differential effect is produced.

In order to obtain aluminium which will have satisfactory properties as an electrochemical material, its alloying has been undertaken. Aluminium alloys with added small quantities of gallium, indium, and thallium, as described in the Yugoslav Pat. No. P-405/75, have displayed adequate electrochemical characteristics, producing high anodic dissolution currents and resistance to corrosion, with a considerably reduced negative differential effect.

SUMMARY OF THE INVENTION

In this invention, the applicant has obtained unexpectedly good results by alloying aluminium with small quantities of gallium or indium, and phosphorus, as well as with all these three addition components together. The individual proportion of each of these components can be in the range of 0.01–1 parts per weight per 100 parts per weight of aluminium.

It has been demonstrated experimentally:

(a) that said alloys have a comparatively very negative stationary potential in alkali chloride solutions (up to 1700 mV according to SCE/Saturated Calomel Electrode/, while its value for pure aluminium amounts to 800 mV.

(b) that the corrosion rate of these alloys when staying in the solution is several times less than that for alloys without phosphorus, so that no important self-discharge takes place and there is no useless loss of metal;

(c) that in the positivation these alloys dissolve up to comparatively high current densities without passivization and with a comparatively low anodic overtension (i.e. with low tension loss);

(d) that the corrosion current (hydrogen separation) increases insignificantly, so that the utilisation of aluminium in the form of anodic current is much bigger that with alloys without phosphorus.

The way of preparing the alloys:

(a) all the elements are added to aluminium together;

(b) preliminary alloying first, then addition of phosphorus.

BRIEF DESCRIPTION OF THE DRAWING FIGURES

EXAMPLE 1

An aluminium alloy with gallium and phosphorus was prepared by adding to a 100 parts of weight of aluminium having a 99.999% purity 0.1 part of weight of gallium. The mixture was heated to fusion of both metals in an inert atmosphere. The melt was quickly cooled in a steel mould. From the obtained Al-Ga binary alloy, an Al-Ga-P ternary alloy was prepared by placing in a recess formed in a sample of the alloy 0.1 part of weight of red phosphorus per a 100 parts of weight of the alloy. The melting took place in the inert atmosphere of an induction furnace. The melt was quickly cooled and an alloy having good electrochemical properties was obtained. The stationary potential, measured in a NaCl solution (1 M), amounted to 1600 mV according to SCE.

Figure 1:
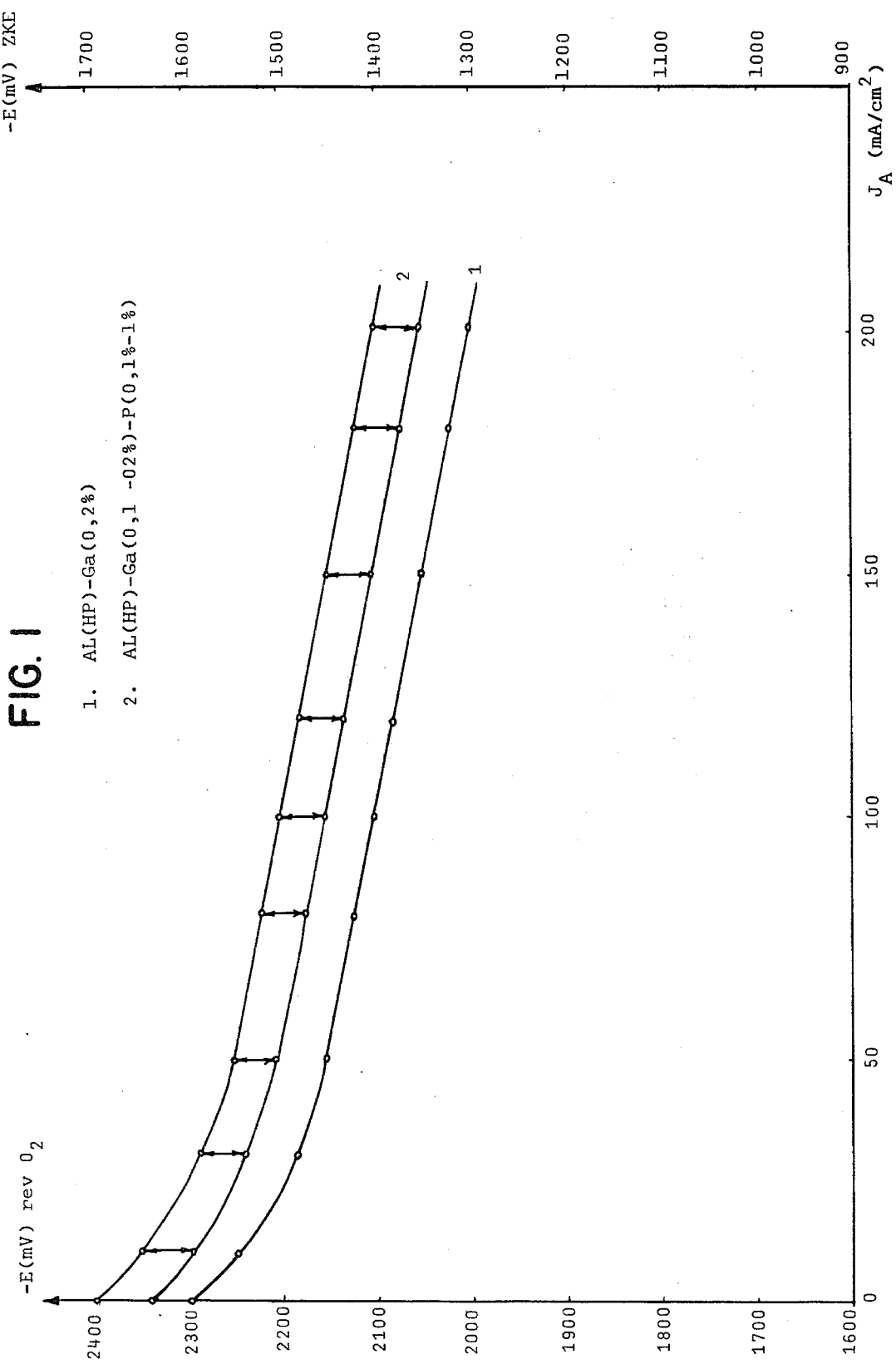
FIG. 1 is a graph illustrating polarization as a function of anodic current for an aluminum-gallium alloy and an aluminum-gallium-phosphorous alloy according to the present invention, both in electrolytic solution.
Figure 2:
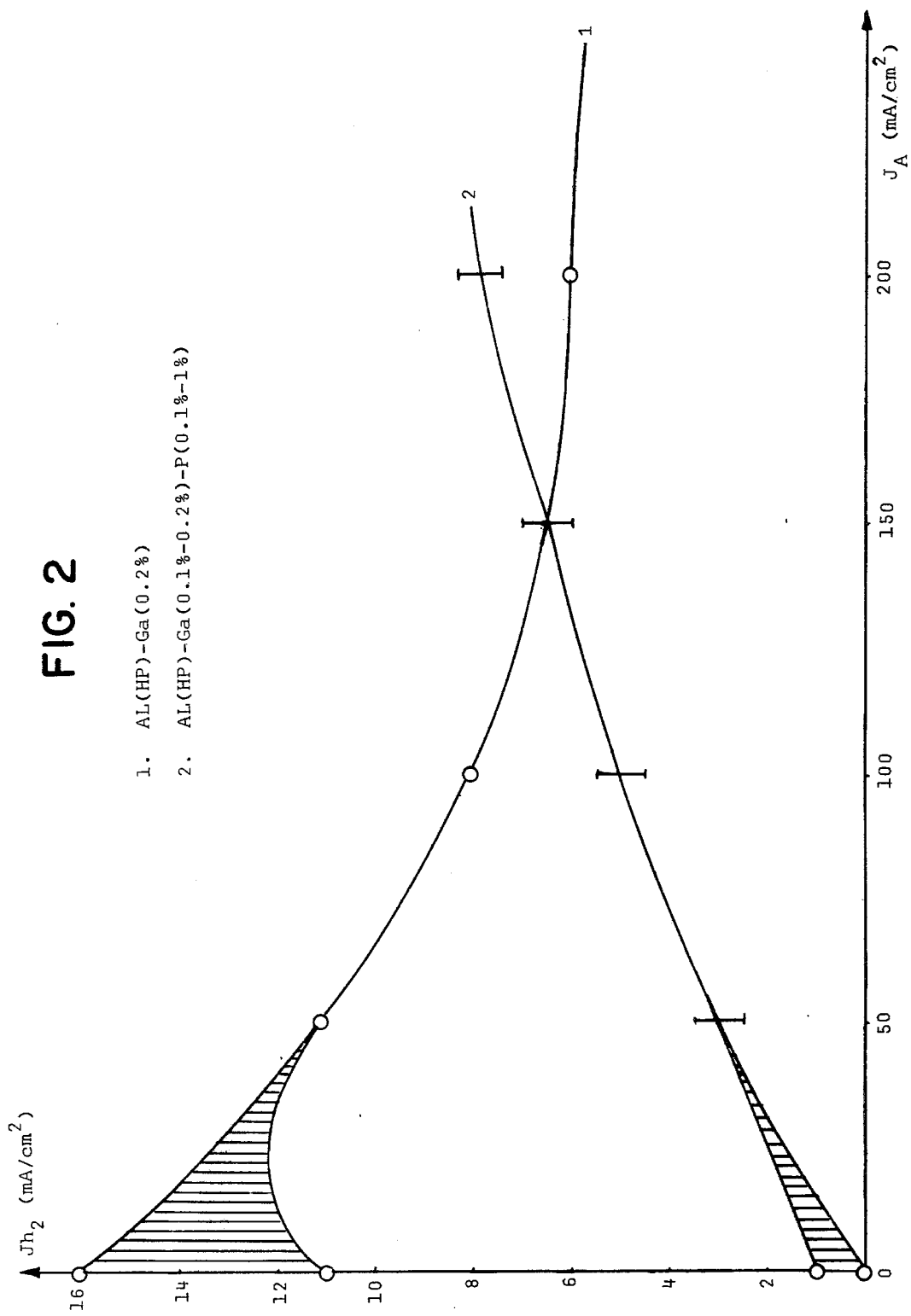
FIG. 2 is a graph illustrating corrosion current as a function of anodic current for the same alloys of FIG. 1, both in electrolytic solutions.

The corrosion rate was measured at this potential and found to be negligibly small, i.e. in the course of 24 hours only a few small blow holes were noted. The anodic polarisation curve was recorded and it was established that anodic currents up to 200 mA/cm$^2$ were obtained with minimal polarisation (below 200 mV). The corrosion rate increased with the increase of anodic current (negative differential effect), but considerably less than with pure aluminium or with the Al-Ga binary alloy. The enclosed two diagrams illustrate these results (FIGS. 1 and 2).

EXAMPLE 2

Figure 3:
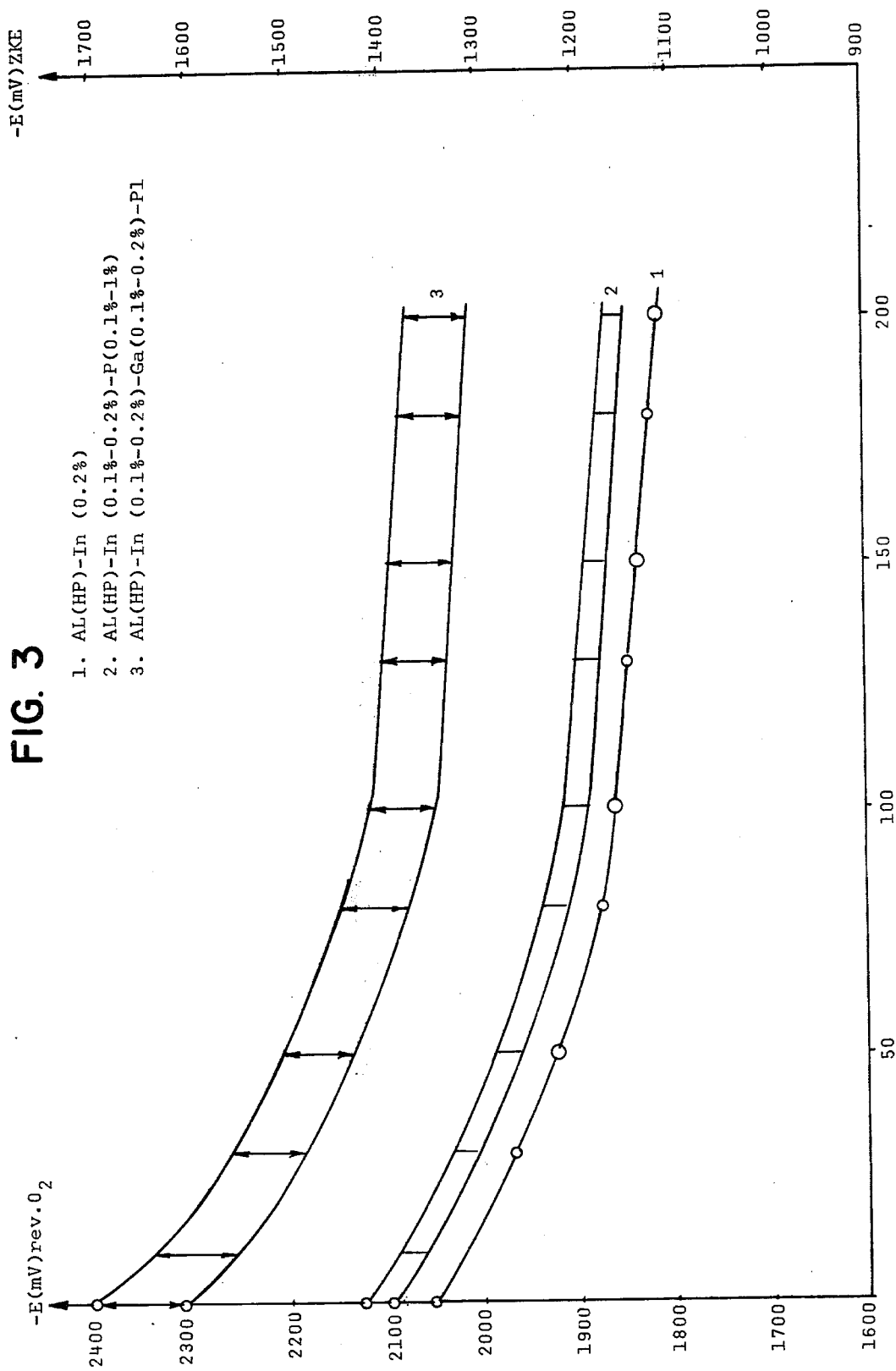
FIG. 3 is a graph illustrating polarization as a function of anodic current for an aluminum-indium alloy, an aluminum-indium-phosphorous alloy and an aluminum-indium-gallium alloy according to the present invention, all in electrolytic solutions.
Figure 4:
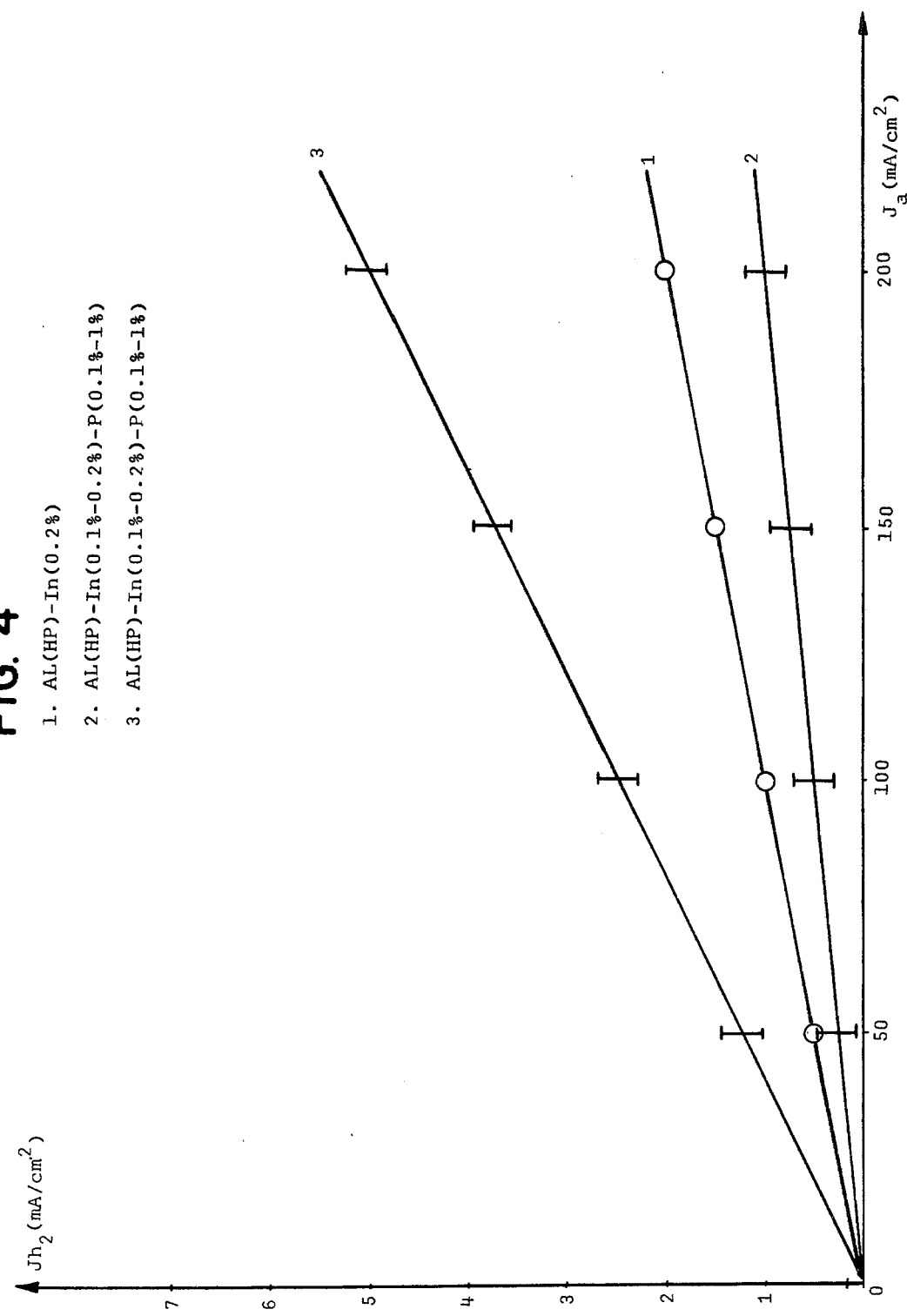
FIG. 4 is a graph illustrating corrosion current as a function of anodic current for the same alloys of FIG. 3, all in electrolytic solutions.

An aluminium alloy with indium and phosphorus was prepared by the method of Example 1, with the difference that instead of gallium 0.1 part of weight of indium was added per a 100 parts of weight of aluminium. The stationary potential for this alloy, measured in a NaCl solution, amounted to 1450 mV according to SCE, and a very low polarisation and a low negative differential effect were obtained, as shown in FIGS. 3 and 4. The corrosion amounted to only 1% of the anodic dissolution rate, compared with 16% for pure aluminium. On the other hand, the stationary potential and the polarisation curve were more negative than for alloys with indium with no phosphorus added.

EXAMPLE 3

An aluminium alloy with gallium, indium and phosphorus was prepared by mixing together Al-Ga-P and Al-In-P alloys in various proportions of weight. The alloy melted in this way and quickly cooled, having for example In, Ga, and P contents of 0.13, 0.07, namely 0.1 part of weight per a 100 parts of weight of aluminium, displayed, when tested as an electrode in a NaCl solution, the electrochemical properties shown in FIGS. 3 and 4. The measured stationary potential amounted to about 2 mA/cm$^2$, which is several times less than for the same Al-In-Ga alloy without phosphorus (same proportions of In and Ga). In this way has been obtained the so far most suitable aluminium alloy for electrochemical use.

It has been unexpectedly established that aluminium alloys of this kind can successfully replace the materials used so far (zinc, for instance), from which a high electrochemical activity is requested, such as the anodes of primary batteries or batteries with exchangeable plates. These alloys can also be used very successfully as coatings in anti-corrosion protection (for instance in motorcars, ships, etc.). The price of this material is much lower than the price of any material used so far.

We claim:

1. Electrochemically active aluminum alloy, characterized in that it consists essentially of, per 100 parts of weight of AL, 0.01–1 parts of weight of Ga and/or In, and in that it consists essentially of 0.01–1 parts of weight of P.

2. Electrochemically active aluminum alloy as in claim 1, characterised in that it is prepared by simultaneous fusion of the components in an inert atmosphere, or by a previous fusion of Al, Ga, and/or In, to which P is then added in an inert atmosphere, the obtained melted mixture being then submitted to quick cooling.

3. Electrochemically active aluminum alloy as in claim 2, wherein the melted mixture is submitted to quick cooling by pouring the mixture into a cold metallic mold.

4. An anode for use in chemical sources of electrical current formed from the electrochemically active aluminum alloy defined in claim 1.

5. An article provided with an anti-corrosion protective coating of the electrochemically active aluminum alloy defined in claim 1.

* * * * *